(12) United States Patent
Bugli et al.

(10) Patent No.: US 7,674,306 B2
(45) Date of Patent: Mar. 9, 2010

(54) MULTILAYERED LONG LIFE FILTER USING CONVOLUTED FOAM

(75) Inventors: Neville J. Bugli, Novi, MI (US); Mark D. Hellie, Westland, MI (US); Reza Abdolhosseini, West Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 80 days.

(21) Appl. No.: 11/671,086

(22) Filed: Feb. 5, 2007

(65) Prior Publication Data

US 2008/0184684 A1 Aug. 7, 2008

(51) Int. Cl.
*B01D 46/00* (2006.01)
*B01D 39/00* (2006.01)

(52) U.S. Cl. .......... 55/486; 55/DIG. 13; 55/487; 55/DIG. 42

(58) Field of Classification Search .......... 55/DIG. 13, 55/486, 487, 521, DIG. 42, 522, 485, 482; 95/286, 287
See application file for complete search history.

(56) References Cited

U.S. PATENT DOCUMENTS

| | | | |
|---|---|---|---|
| 1,843,446 A | 2/1932 | Drager et al. | |
| 3,766,629 A * | 10/1973 | Lechtenberg | 29/412 |
| 4,178,161 A | 12/1979 | Rudner et al. | |
| 4,631,077 A * | 12/1986 | Spicer et al. | 55/487 |
| 4,640,779 A | 2/1987 | Taki et al. | |
| 4,758,460 A * | 7/1988 | Spicer et al. | 428/159 |
| 4,826,882 A * | 5/1989 | Bredbenner et al. | 521/112 |
| 5,114,448 A * | 5/1992 | Bartilson | 55/491 |
| 5,123,936 A | 6/1992 | Stone et al. | |
| 5,573,811 A * | 11/1996 | Townsley | 427/244 |
| 5,716,521 A | 2/1998 | Whitely et al. | |
| 6,159,258 A * | 12/2000 | Ager et al. | 55/318 |
| 6,280,824 B1 | 8/2001 | Insley et al. | |
| 6,464,761 B1 | 10/2002 | Bugli | |
| 6,589,317 B2 | 7/2003 | Zhang et al. | |
| 6,811,588 B2 | 11/2004 | Niakin | |
| 6,843,820 B2 | 1/2005 | Kubokawa | |
| 6,890,366 B2 | 5/2005 | Bugli et al. | |
| 6,926,750 B2 | 8/2005 | Tanaka et al. | |
| 7,070,641 B1 | 7/2006 | Gunderson et al. | |
| 2006/0026937 A1 | 2/2006 | Nicols | |

* cited by examiner

*Primary Examiner*—Duane Smith
*Assistant Examiner*—Sonji Turner
(74) *Attorney, Agent, or Firm*—Fraser Clemens Martin & Miller LLC; J. Douglas Miller

(57) ABSTRACT

A filtration device is disclosed, wherein filtering layers are formed from foam and include convolutions formed in at least one surface thereof.

14 Claims, 1 Drawing Sheet

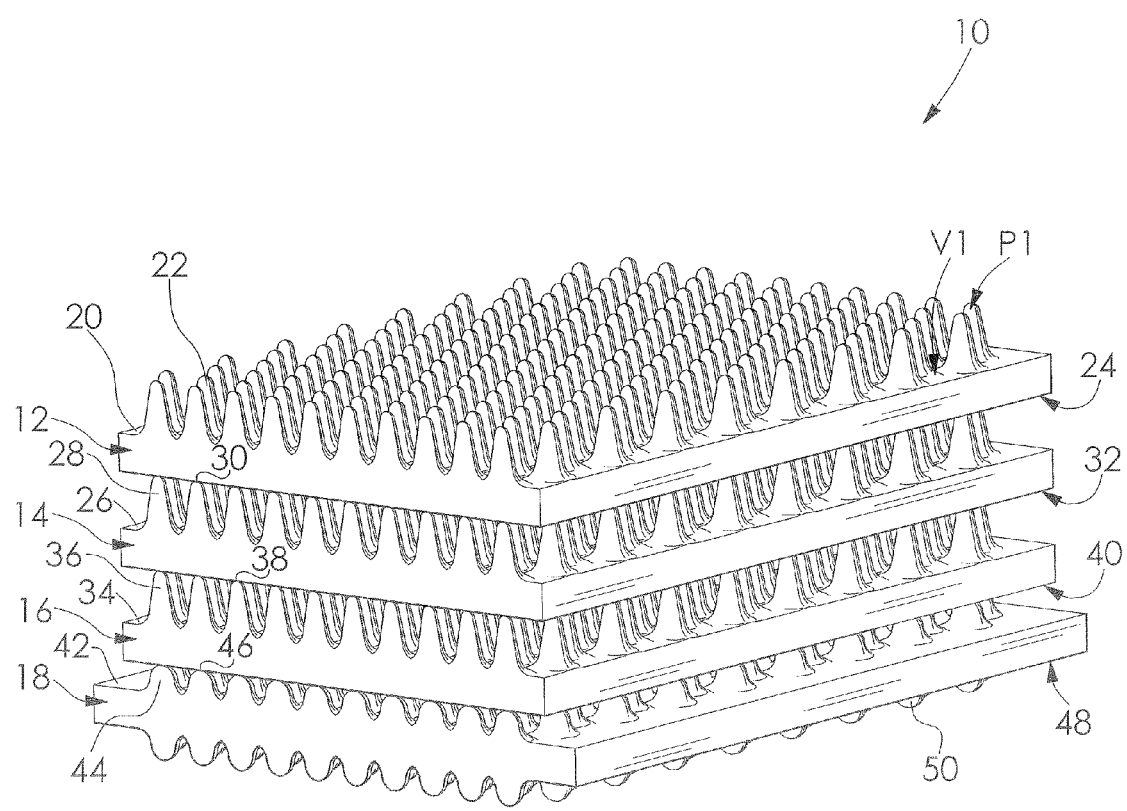

MULTILAYERED LONG LIFE FILTER USING CONVOLUTED FOAM

FIELD OF THE INVENTION

The invention relates to a filtration device and more particularly a filtration device including at least one filtering layer having a convoluted surface.

BACKGROUND OF THE INVENTION

An internal combustion engine requires clean, filtered air to meet current efficiency and durability requirements. A variety of filtration devices are used to remove particulate contaminants, including dust particles, mists, smoke particles, and the like from air entering the engine.

Typically, filtration devices include a filtering media disposed inside a housing. A fluid such as air, for example, flows into the housing and through the filtering media. As the fluid passes through the filtering media, particulate contaminants are removed therefrom. After passing through the filtering media, the fluid flows out of the housing and to a desired location, such as an automobile engine, for example.

It is desirable to produce filtering media having a maximized filtration capacity and efficiency and a minimized flow restriction of the fluid flowing therethrough. U.S. Pat. No. 4,118,161 discloses a manufacturing process for rigidized convoluted foam, wherein the resultant product could be used as an air filter. The manufacturing process to rigidize the foam involves nesting a plurality of convoluted foam sheets and thereafter impregnating the foam sheets with a mixture of a thermosetting melamine, urea, or benzoguanamine resin and a cross-linker. After the resin mixture has reacted, the nested foam sheets are separated. Each unnested sheet could be used as a convoluted, self-standing air filter.

It would be desirable to produce a filtration device for an internal combustion engine which could be simply and inexpensively manufactured and installed, wherein a flow restriction caused by the filter media is minimized and a capacity and an efficiency thereof are maximized.

SUMMARY OF THE INVENTION

Harmonious with the present invention, a filtration device for an internal combustion engine which could be simply and inexpensively manufactured and installed, wherein a flow restriction caused by the filter media is minimized and a capacity and an efficiency thereof are optimized, has surprisingly been discovered.

In one embodiment, a filter element comprises: a plurality of filtering layers adapted to be disposed in a filter housing, wherein at least one surface of at least one filtering layer is formed from foam and includes at least one convoluted surface.

In another embodiment, a filter element comprises: a plurality of foam filtering layers, wherein each of the foam filtering layers includes at least one convoluted surface.

In another embodiment, a filter element comprises: a first filtering layer adapted to be disposed in a filter housing; a second filtering layer disposed adjacent the first filtering layer in the filter housing; a third filtering layer disposed adjacent the second filtering layer in the filter housing; and a fourth filtering layer disposed adjacent the third filtering layer in the filter housing, wherein at least one surface of at least one of the first filtering layer, the second filtering layer, the third filtering layer, and the fourth filtering layer is formed from foam and includes at least one convoluted surface.

DESCRIPTION OF THE DRAWINGS

The above, as well as other objects and advantages of the invention, will become readily apparent to those skilled in the art from reading the following detailed description of a preferred embodiment of the invention when considered in the light of the accompanying drawing which is a perspective view of a filter element in accordance with an embodiment of the invention.

DETAILED DESCRIPTION OF EXEMPLARY EMBODIMENTS OF THE INVENTION

The following detailed description and appended drawing describe and illustrate various exemplary embodiments of the invention. The description and drawing serve to enable one skilled in the art to make and use the invention, and are not intended to limit the scope of the invention in any manner.

The drawing shows a filter element 10 including a first filtering layer 12, a second filtering layer 14, a third filtering layer 16, and a fourth filtering layer 18. It is understood that additional or fewer filtering layers (not shown) can be used to form the filter element 10 as desired. The filter element 10 is adapted to be disposed in a filter housing (not shown).

The first filtering layer 12, the second filtering layer 14, and the third filtering layer 16 have a substantially rectangular shape when viewed in plan. It is understood that the first filtering layer 12, the second filtering layer 14, and the third filtering layer 16 can have other shapes as desired. The first filtering layer 12, the second filtering layer 14, and the third filtering layer 16 are formed from foam capable of collecting contaminants such as carbon dust shedding, for example. Favorable results have been found using an open cell foam, a reticulated foam, or a reticulated "open cell" polyurethane foam. A density of the open cell foam is about 1.75 lbs/ft$^3$, 796 g/ft$^3$, or 28111 g/m$^3$. It is understood that other materials may be used to form the first filtering layer 12, the second filtering layer 14, and the third filtering layer 16 as desired. The first filtering layer 12 shown includes a porosity in the range of about 15 to 30 pores per inch (ppi). The second filtering layer 14 shown includes a porosity in the range of about 30 to 65 pores per inch (ppi) The third filtering layer 16 shown includes a porosity in the range of about 65 to 80 pores per inch (ppi). It is understood that the first filtering layer 12, the second filtering layer 14, and the third filtering layer 16 may have other porosities as desired.

Respective first surfaces 20, 26, 34 of the first filtering layer 12, the second filtering layer 14, and the third filtering layer 16 include a plurality of projections 22, 28, 36 extending laterally outwardly therefrom. The plurality of projections 22, 28, 36 cooperate to form convolutions on the respective first surfaces 20, 26, 34. In the embodiment shown, the projections 22, 28, 36 extend from the respective first surfaces 20, 26, 34 in a plurality of rows and columns in a regular pattern. It is understood that the projections 22, 28, 36 can be arranged in other patterns, such as a random pattern, as desired. Optionally, distal ends 30, 38 of one or more of the projections 28, 36 may include an adhesive (not shown) disposed thereon, such as a glue, for example, to militate against relative movement between adjacent filtering layers 12, 14, 16.

In the embodiment shown, respective second surfaces 24, 32, 40 of the first filtering layer 12, the second filtering layer 14, a the third filtering layer 16 are substantially planar. It is understood that the second surfaces 24, 32, 40 can have other shapes as desired, such as described above for the first surfaces 20, 26, 34 for example.

The fourth filtering layer 18 has a substantially rectangular shape when viewed in plan. It is understood that the fourth filtering layer 18 can have other shapes as desired. The fourth filtering layer 18 is formed from foam capable of collecting contaminants such as carbon dust shedding, for example. Favorable results have been found using an open cell foam, a reticulated foam, or a reticulated "open cell" polyurethane foam. A density of the open cell foam is about 1.75 lbs/ft³, or 796 g/ft³, or 28111 g/m³. It is understood that other materials may be used to form the fourth filtering layer 18 as desired. The fourth filtering layer 18 shown includes a porosity in the range of about 80 to 100 pores per inch (ppi). It is understood that the fourth filtering layer 18 may have other porosities as desired.

In the embodiment shown, a first surface 42 of the fourth filtering layer 18 includes a plurality of projections 44 extending laterally outwardly therefrom. The plurality of projections 44 cooperates to form convolutions on the first surface 42. The projections 44 extend from the first surface 42 in a plurality of rows and columns in a regular pattern. It is understood that the convolutions 42 can be arranged in other patterns, such as a random pattern, as desired. Optionally, distal ends 46 of one or more of the projections 44 may include an adhesive (not shown) disposed thereon, such as a glue, for example to militate against relative movement between adjacent filtering layers 16, 18.

In the embodiment shown, second surface 48 of the fourth filtering layer 18 includes a plurality of projections 50 extending laterally outwardly therefrom. The plurality of projections 50 cooperates to form convolutions on the second surface 48. The projections 50 extend from the second surface 48 in a plurality of rows and columns in a regular pattern. It is understood that the projections 50 can be arranged in other patterns, such as a random pattern, as desired.

As illustrated, a length and a width of the filtering layers 16, 18 decrease from the fourth filtering layer 18 to the third filtering layer 16. The length and the width of the filtering layers 16, 18 decrease to substantially conform to dimensions of the filter housing. Optionally, the dimensions of the filtering layers 12, 14, 16, 18 can be slightly larger than the dimensions of the filter housing. Accordingly, when disposed in the filter housing, the filtering layers 12, 14, 16, 18 are caused to be compressed slightly to fit inside of the filter housing. For filter housings having different dimensions, the dimensions of the filtering layers 12, 14, 16, 18 may change accordingly.

To assembly the filter element 10, the filtering layers 12, 14, 16, 18 are aligned in a stacked relationship. The adhesive, when used, is disposed on the distal ends 30, 38, 46 of the projections 28, 36, 44, to adhere the filtering layers 12, 14, 16, 18 together. The fitter element 10 is then disposed inside of the filter housing and placed in a desired position.

In use, a fluid (not shown) such as air flows through an inlet of the filter housing. As the fluid flows through the first filtering layer 12, contaminants such as dust particles, mists, smoke particles, and the like are filtered from the fluid. Peaks P1 and valleys V1 on the first filtering layer 12 maximize a total surface area of the first filtering layer 12, thereby maximizing the filtering capacity of the first filtering layer 12.

The fluid then flows through the second filtering layer 14 where additional contaminants are filtered. Since the porosity of the second filtering layer 14 is greater than the porosity of the first filtering layer 12, contaminants having a smaller size are filtered by the second filtering layer 14. The convolutions formed non the second filtering layer 14 maximize a total surface area of the second filtering layer 14. Thus, a filtering capacity of the second filtering layer 14 is maximized.

The fluid then flows through the third filtering layer 16 where additional contaminants are filtered. Since the porosity of the third filtering layer 16 is greater than the porosity of the second filtering layer 14, contaminants having a smaller size are filtered by the third filtering layer 16. The convolutions formed on the third filtering layer 16 maximize a surface area of the third filtering layer 16 which maximizes a filtering capacity of the third filtering layer 16.

The fluid then flows through the fourth filtering layer 18 where additional contaminants are filtered Since the porosity of the fourth filtering layer 18 is greater than the porosity of the third filtering layer 16, contaminants having a smaller size are filtered by the fourth filtering layer 18. The convolutions formed on the fourth filtering layer 18 maximize a surface area of the fourth filtering layer 18. Accordingly, a filtering capacity of the fourth filtering layer 18 is maximized. It has been found that the projections 50 that extend from the second surface 48 of the fourth filtering layer 18 provide a reduction of noise produced by the filter element 10 while maximizing fluid flow through the filter element 10.

While each of the filtering layers 12, 14, 16, 18 are shown having at least one surface 20, 26, 34, 42, 48 including projections 22, 28, 36, 44, 50, it is understood that some of the filtering layers 12, 14, 16, 18 may optionally be substantially planar and not include convolutions. Alternatively, the convolutions may be formed on the respective other surfaces 24, 32, 40 thereof. Additionally, while the porosity of the filtering layers 12, 14, 16, 18 has been described as increasing from the first filtering layer 12 to the fourth filtering layer 18, other configurations can be used as desired, such as wherein all filtering layers 12, 14, 16, 18 have substantially the same porosity, the porosity of one or more adjacent layers is substantially the same, or the porosity of the filtering layers 12, 14, 16, 18 decreases from the first filtering layer 12 to the fourth filtering layer 18, for example.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A filter element adapted to be disposed in a filter housing comprising:
    a first foam filtering layer having a first convoluted surface and a spaced apart second convoluted surface, wherein the first and second convoluted surfaces are formed by a plurality of projections extending outwardly from the first foam filtering layer and terminating at distal ends; and
    a second foam filtering layer having a substantially planar surface and a spaced apart convoluted surface, wherein the spaced apart convoluted surface is formed by a plurality of projections extending outwardly from the second foam filtering layer and terminating at distal ends, wherein the distal ends of the projections on the second convoluted surface of the first foam filtering layer abut the substantially planar surface of the second foam filtering layer, wherein the first foam filtering layer and the second foam filtering layer are directly stacked on one another.

2. The filter element according to claim 1, wherein each of the first and second filtering layers has a porosity of between about 15 and about 100 ppi.

3. The filter element according to claim 1, wherein a length and a width of at least one filtering layer are larger than a length and a width of the filter housing.

4. The filter element according to claim 1, wherein the filtering layers are arranged in a stacked relationship from an inlet of the filter housing to an outlet of the filter housing and configured for a fluid to flow therethrough from the inlet to the outlet.

5. The filter element according to claim 1 further comprising:
- a third foam filtering layer having a substantially planar surface and a spaced apart convoluted surface, wherein the spaced apart convoluted surface is formed by a plurality of projections extending outwardly from the third foam filtering layer and terminating at distal ends, wherein the distal ends of the projections forming the convoluted surface of the second foam filtering layer abut the substantially planar surface of the third foam filtering layer; and
- a fourth foam filtering layer having a substantially planar surface and a spaced apart convoluted surface, wherein the spaced apart convoluted surface is formed by a plurality of projections extending outwardly from the fourth foam filtering layer and terminating at distal ends, wherein the distal ends of the projections forming the convoluted surface of the third foam filtering layer abut the substantially planar surface of the fourth foam filtering layer.

6. The filter element according to claim 5, wherein the first filtering layer has a porosity of between 15 and 30 ppi, the second filtering layer has a porosity of between 30 and 65 ppi, the third filtering layer has a porosity of between 65 and 80 ppi, and the fourth filtering layer has a porosity of between 80 and 100 ppi.

7. The filter element according to claim 1, wherein the projections of the convoluted surfaces are arranged in columns and rows.

8. The filter element according to claim 1, wherein the projections of the convoluted surfaces are arranged in a random pattern.

9. The filter element according to claim 1, wherein there is an adhesive disposed between the distal ends of the projections and the substantially planar surface.

10. The filter element according to claim 1, wherein a height of the projections on the first convoluted surface and the second convoluted surface of the first foam filtering layer is less than a height of the projections on the convoluted surface of the second foam filtering layer.

11. The filter element according to claim 10, wherein a thickness of the first foam filtering layer is substantially the same as a thickness of the second foam filtering layer.

12. A filtration device comprising:
- a filter housing having an inlet and an outlet; and
- a filter element including
  - a first foam filtering layer having a first convoluted surface and a spaced apart second convoluted surface, wherein the first and second convoluted surfaces are formed by a plurality of projections extending outwardly from the first foam filtering layer and terminating at distal ends; and
  - a second foam filtering layer having a substantially planar surface and a spaced apart convoluted surface, wherein the spaced apart convoluted surface is formed by a plurality of projections extending outwardly from the second foam filtering layer and terminating at distal ends,
- wherein the filtering layers are arranged in a stacked relationship from the inlet of the filter housing to the outlet of the filter housing and configured for a fluid to flow therethrough from the inlet to the outlet,
- wherein the distal ends of the projections on the second convoluted surface of the first foam filtering layer abut the substantially planar surface of the second foam filtering layer, wherein the first foam filtering layer and the second foam filtering layer are directly stacked on one another.

13. The filtration device according to claim 12 wherein there is an adhesive disposed between the distal ends of the projections and the substantially planar surface, wherein the projections of the convoluted surfaces are arranged in columns and rows.

14. The filtration device according to claim 12, wherein an average height of the projections on the first convoluted surface and the second convoluted surface of the first foam filtering layer is less than an average height of the projections on the convoluted surface of the second foam filtering layer.

* * * * *